United States Patent [19]

Tieleman

[11] Patent Number: 4,731,907
[45] Date of Patent: Mar. 22, 1988

[54] DEVICE FOR CUTTING OPEN SLAUGHTERED POULTRY

[75] Inventor: Rudolf J. Tieleman, Aw Doesburg, Netherlands

[73] Assignee: Linco Holland Engineering B.V., Doesburg, Netherlands

[21] Appl. No.: 46,228

[22] Filed: May 4, 1987

[30] Foreign Application Priority Data

May 16, 1986 [EP] European Pat. Off. ......... 86200850.5

[51] Int. Cl.⁴ .......................................... A22C 21/00
[52] U.S. Cl. .................................................. 17/11
[58] Field of Search ............................. 17/11, 52, 45

[56] References Cited

U.S. PATENT DOCUMENTS 4,265,001  5/1981  Hathorn et al. .................... 17/11
4,339,849  7/1982  van Mil ........................... 17/11 X Primary Examiner—Willie G. Abercrombie
Attorney, Agent, or Firm—Beveridge, DeGrandi & Weilacher

[57] ABSTRACT

Device for cutting open the bottom of slaughtered poultry, provided with a knife which is movable along an arc of a circle by means of a follower cooperating with a curved path. According to the invention at least part of the cutting edge of the knife is at least substantially vertical at the beginning of the operative stroke and substantially horizontal at the end of the operative stroke and the said part of the cutting edge of the knife in the operative direction of movement thereof is trailing with respect to the foremost outermost point of the cutting in that direction.

9 Claims, 5 Drawing Figures

DEVICE FOR CUTTING OPEN SLAUGHTERED POULTRY

The invention relates to a device for cutting open the bottom of a slaughtered bird suspended with the legs on a hook of a conveyor, comprising a processing member to be inserted into the bird and provided with a cutting edge, said cutting edge being movable along part of a circular arc and cooperating wtih a follower, which in its turn cooperates with a fixedly mounted curved path, said processing member being mounted on a slide movable up and down in the direction of the bird along a slide guide moving along with the conveyor and cooperating with a fixedly mounted curved path for control of the movement of the slide, which is provided with a bottom clip which can engage the bottom between the legs of the bird.

A similar device is known from Dutch patent application No. 78.01689 laid open to public inspection. In this known device the processing member consists of two parts, a spherical centering cam being applied under the actual knife consisting of two halves. The spherical centering cam is applied as a whole in the vent opening of the bird and then one-half sphere with the knife positioned above it is moved along a circular arc with a large radius in outward direction by means of the respective curved path with the follower, and the knife cuts open the skin of the bird over the bottom.

In this known device the processing member with the spherical centering cam should be inserted deeply into the bird (up to a depth of 5 to 6 cm), in order that the knife positioned above the centering cam can cut the skin of the bird entirely through, when in spite of the application of the spherical centering cam the intestines and/or other organs of the bird may be damaged, the knife when inserted being substantially vertical and remaining substantially vertical during the movement along the arc of a circle and thus one-half sphere being moved over and partly through the intestines and other organs of the bird, which may cause further damages.

In this known device the stroke of the processing member, that is to say the movement along the arc of a circle should be larger than the distance between tail and breast bone, because the knife as it were pushes the bird's skin forward and rolls it up and with not too sharp a knife it may even occur that the skin is torn open and sometimes in a place different from where the knife is.

The other half sphere of the centering cam, which remains in place, may damage the rectum of the bird because this half sphere should press the bird against the back support.

The invention aims at eliminating the objections of this known device.

This object is attained in that according to the invention at least a part of the cutting edge of the processing member from the foremost, outermost point thereof is substantially vertical at the beginning of the operative stroke and is substantially horizontal at the end of the operative stroke and in that at least the said part of the cutting edge of the processing member in the operative direction of movement of the processing member is trailing with respect to the foremost outermost point of the cutting edge in that direction.

By application of these measures it is achieved that the cutting edge of the processing member substantially from the beginning of the operative stroke moves at least partly under the skin of the bird, the foremost, outermost point of the cutting edge in the operative direction of movement of the processing member leading the said portion of the cutting edge so that the skin of the bird as it were is cut through in upward direction. This brings with it that the skin of the bird is cut through smoothly and straight over the desired length and in the desired place at all times and the cutting edge need be inserted into the skin only over a very small distance, 1 to 1.5 cm, so that the risk of damage of the intestines and other organs of the bird is reduced to a minimum.

In a preferred embodiment of the device according to the invention the processing member is drivably coupled to a second slide by means of a transmission device, which slide is movable up and down along a slide guide moving along with the conveyor in the direction of the bird and to which the follower is applied.

Thanks to the coupling between the processing member and the second slide the reciprocating movement of the second slide can be converted into a rotary movement of the processing member in a constructively simple and reliable way.

The invention will be elucidated with the aid of the drawings with an example.

Figure 1:
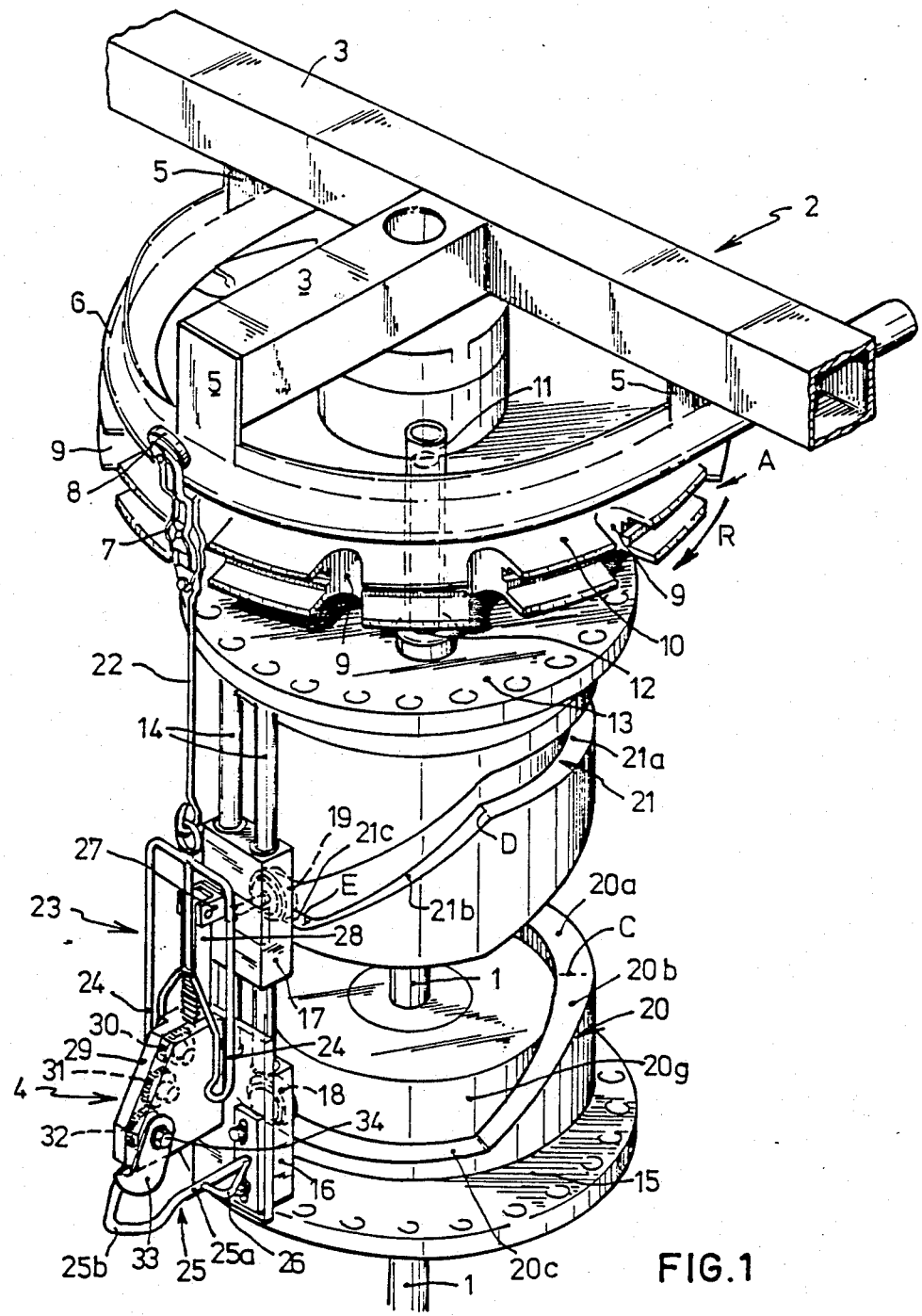
FIG. 1 is a perspective view of the device according to the invention.

The device according to the invention drawn in FIG. 1 is mounted on a central, vertical, stationary shaft 1, which is supported in a frame 2, which is only partly represented and consists of a rectangular frame of for instance box girders 3, which bears upon the ground with legs (not drawn). The shaft 1 is vertically adjustable in the frame 2, for instance by means of a handle and a toothed gearing (not drawn) which is in engagement with a toothed rack on the shaft 1, and can be secured in any position.

The device according to FIG. 1 is constructed as a turret, that is a plurality of processing units 4, for instance eight or twelve, or any other number of units 4, are rotatable about the central shaft 1.

From the upper side of the frame 1 a rail 6 is suspended by means of strips, over which rail trolleys 7 are movable, which are mutually connected by a chain and which are part of a production line, which can be passed along a series of processing machines for slaughtered poultry. The trolleys 7 run with rollers 8 on the inside and outside on the tubular rail 6 and run into the device at A. The trolleys 7 engage in recesses 9 of a type of chain wheel 10 and take it along in the direction of rotation R. The pitch of the recesses 9 is substantially equal to that of the trolleys 7 on the production line.

The chain wheel 10 is provided with a catch sleeve 11, in which a carrier pin 12 engages, which is fastened to an upper plate 13, which is rotatably mounted on the central shaft 1. The upper plate 13 is connected to a lower plate 15 by means of a series of pairs of vertical guide rods 14, which lower plate is also rotatably mounted to the central shaft 1.

On each pair of guide rods 14 a slide 16 with a processing unit 4 and a second slide 17 are mounted, which will be further described hereinunder. Slides 16 and 17 are at their inner sides provided with a follower roller 18 and 19 resp., which cooperate with a curved path 20 and 21, resp., whose function will be described hereinunder.

Figure 2:
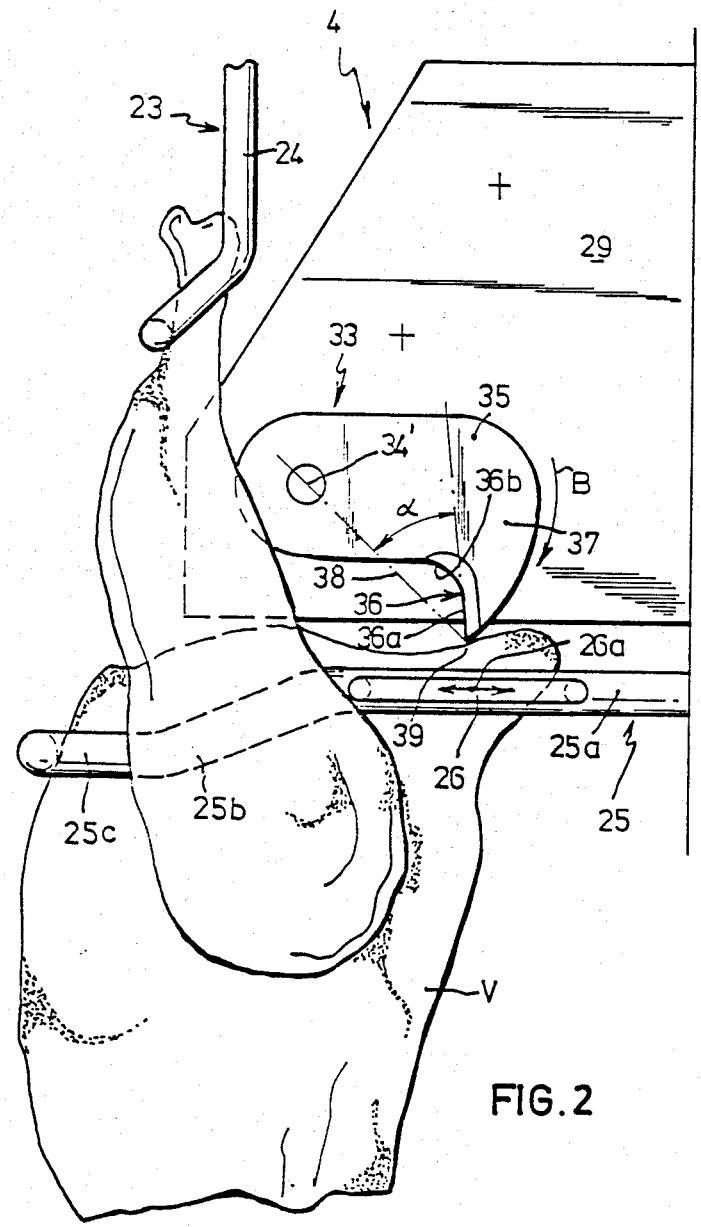
FIG. 2 shows the position of the processing member at the beginning of the operative stroke.
Figure 3:
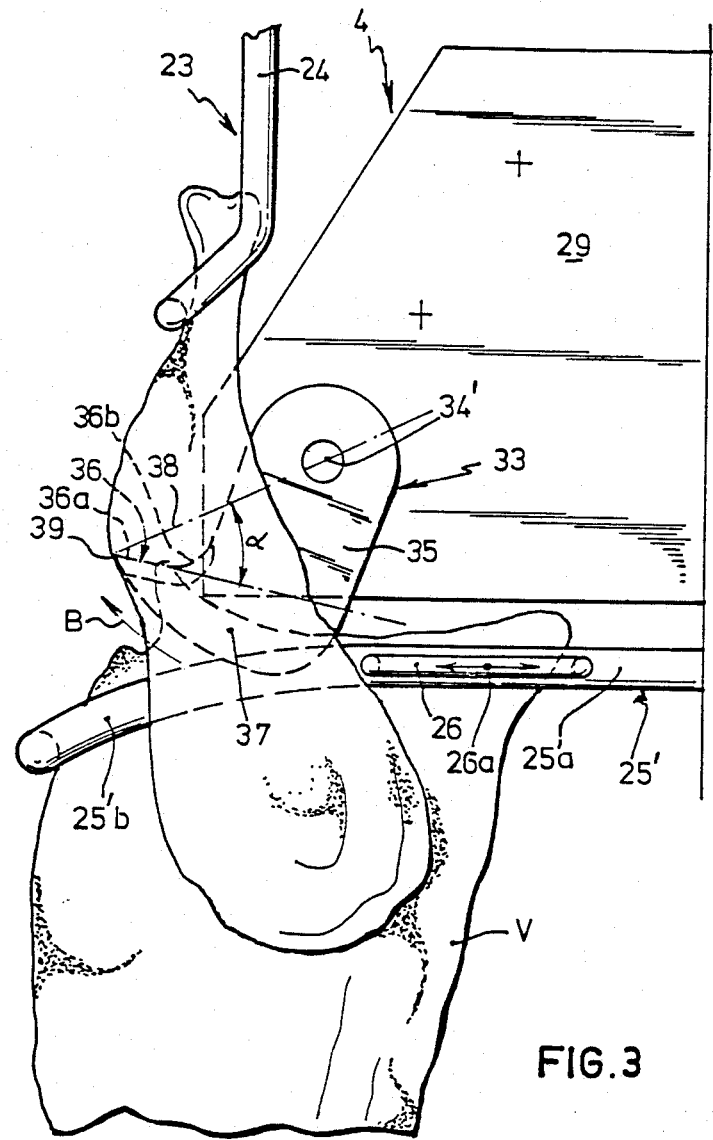
FIG. 3 shows the position of the processing member at the end of the operative stroke.

From the trolleys 7 hinged rods 22 provided with eyes are suspended, from which at the lower end leg hooks 23 are suspended, in which the slaughtered birds V are hung with their ankle joints, as indicated in FIGS. 2 and 3. The leg hooks 23 are U-shaped and the legs 24 of the U are of double construction and themselves also U-shaped, the lower ends of the double legs 24 of the U being bent a bit outwardly to make hooking in of the ankle joints and holding thereof optimal.

Furthermore, a bottom clip 25 is mounted about at right angles to the slide, which clip extends in side view from the slide first about horizontally, section 25a, and is then bent downwardly at an angle of±° with a section 25b and is then bent back horizontally again with a section 25c, vide FIG. 2. In the embodiment of the bottom clip 25' according to FIG. 3 a circular arc shaped portion 25'b connects to the straight portion 25'a. On the outer side of the horizontal sections 25a and 25'a of the bottom clips 25 and 25' adjustable retaining clips 26 are mounted in longitudinal direction of these sections, vide the arrows 26a in FIGS. 2 and 3. Sections 25b and 25'b of the bottom clips 25 and 25' aim at pressing the bird V radially inwardly, so that the bird is pressed with the rear side of the upper legs against the retaining clips 26 and the hinging of the bird V about the ankle joints is prevented.

Furthermore the bottom clips 25 and 25' are vertically adjustably mounted on the slide 16 by means of detachable bolts 25d. The object of this measure is to be able to adapt the cutting depth of the processing member to the size of the slaughtered bird V.

On the slide 17 a bracket 27 is mounted, in which a toothed rack 28 is hingely suspended, which is slidable in a guiding in a toothed gear case 29, which is mounted on the slide 16. In the toothed gear case 29 a series of mutually engaging toothed wheels 30, 31, 32 is rotatably mounted, the toothed wheel 30 of which is in engagement with the toothed rack 28 and on the shaft of the toothed wheel 32 of which the processing member or knife 33 is fastened with a bolt 34.

The knife 33 preferably consists according to the invention of an L-shaped plate, the axis of ratation 34' of the knife being present near the free end of the long leg 35 of the L and the cutting edge 36 being disposed on the short leg 37 of the L and on the side thereof facing the axis of rotation 34', whilst according to the invention at least part of the cutting edge 36 includes a sharp angle of preferably ±40° with the connecting line 38 between the axis of rotation 34 of the knife 33 and the foremost, outermost point 39 of the cutting edge 36 on the side of this connecting line 38 turned away from the operative direction of movement B. Portion 36a of the cutting edge 36 extends from the foremost, outermost point 39 along a straight line and then the cutting edge 36 blends into the long leg 35 of the L-shaped knife 33 via a curved portion 36b. The processing member or knife may also consist of a round plate, in which an L-shaped recess is applied in accordance with the shape of the knife 33 on the side with the cutting edge 36.

According to the invention it is essential that at least the portion 36a of the cutting edge 36 of the processing member 33 from the foremost, outermost point 39 thereof at the beginning of the operative stroke is substantially vertical and at the end of the operative stroke is substantially horizontal and that at least the said portion 36a of the cutting 36 of the processing element 33 in the operative direction of movement B of the processing membrt is trailing with respect to the foremost, outermost point 39 of the cutting edge 36 in that direction. Furthermore according to the invention the processing member 33 is coupled drivably to the second slide 17 by means of the transmission device 28, 30-32, which slide is movable up and down along the slide guide 14 moving along with the conveyor 7 in the direction of the bird V and to which the follower roller 19 is mounted, which cooperates with the fixedly disposed curved path 21.

By application of these measures the technical effect of the invention described in the introductory part of the present patent application is achieved.

Figure 4:
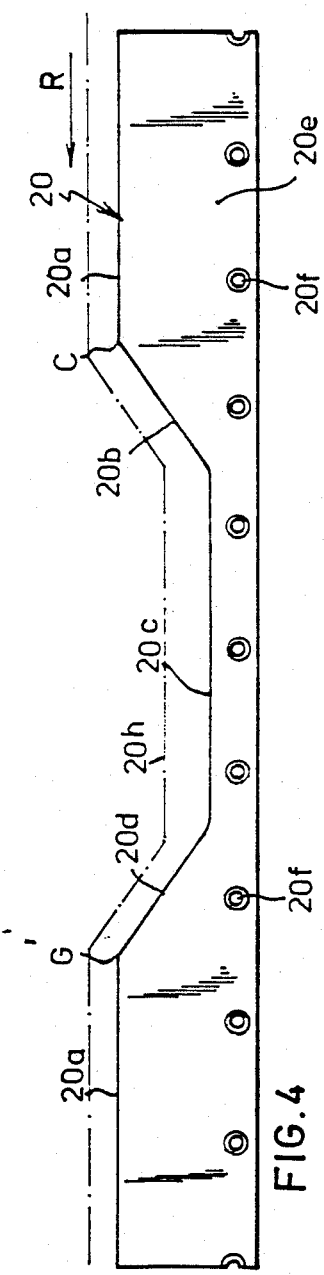
FIG. 4 shows the exploded view in a flat plane of the curved path of the first slide for positioning the processing member and FIG. 5 shows the exploded view in a flat plane of the curved path of the second slide for driving the processing member.
Figure 5:
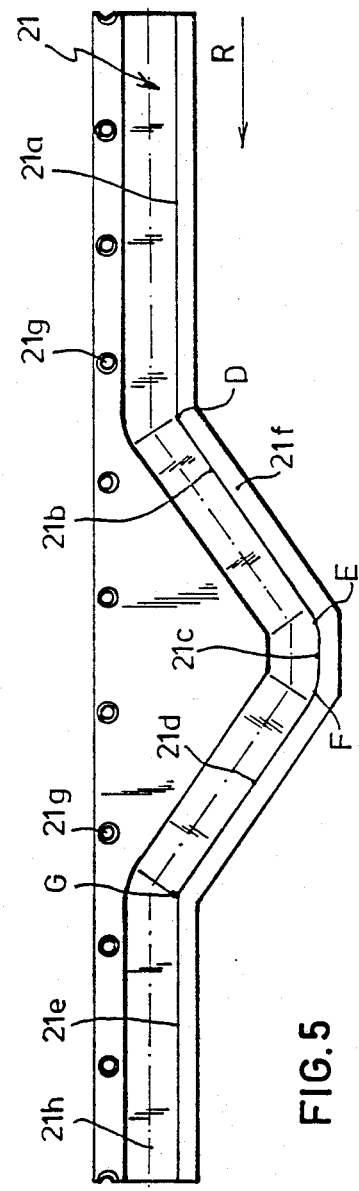

FIGS. 4 and 5 show the exploded view in a flat plane of the curved paths 20 and 21 resp. The curved path 20 (FIG. 4) for the slide 16, which positions the processing unit 4, consists of two equally long high positioned horizontal portions 20a, which are connected end-wise, then in the direction of movement R of the processing unit 4 a portion 20b sloping downwardly at an angle of ±35°, a low positioned horizontal protion 20C and a portion 20d inclining upwardly at an angle of ±35° which connects to a high positioned horizontal portion 20a. The portions 20a-20b-20c-20d-20e are connected to each other via rounded transitions. The portions 20a each extend over a circumferential angle of ±90°, the portions 20b and 20d over an angle of ±40° and the portion 20C over an angle of ±100°. The curved path 20 is disposed on the upper edge of a cylindrical member 20e of for instance nylon (vide FIG. 1), the wall thickness of which is a bit larger than the thickness of the follower roller 18. The cylindrical element 20e is provided with ten bolt holes 20f, which at a mutual angle distance of 36° are disposed near the lower edge of the element 20e and through which bolts are inserted for fastening the member 20e to a drum 20g (FIG. 1), which is fixedly fastened to the central shaft 1. The dotted line 20h represents the path of the axis of the follower roller 18.

The curved path 21 (FIG. 5) for the slide 17, which serves for driving the processing member 33 consists, viewed in the direction of movement R of the processing unit 4, of a high positioned horizontal portion 21, a portion 21b, downwardly inclining at an angle of ±35°, a low positioned short horizontal portion 21c, a portion 21d inclining upwardly at an angle of ±35° and a high positioned horizontal portion 21e, which at its free end connects to the portion 21a. The portions 21a- 21b- 21c- 21d- 21e are mutually connected via rounded transitions. Portion 21a extends over a circumferential angle of ±125°, portion 21b over ±65°, portion 21c over ±15°, portion 21d over ±65 and portion 21e over ±90°.

The curved path 21 consists of a slot in the outer surface of a cilindrical element 21f of for instance nylon (vide FIG. 1), the depth of the slot being a bit larger than the width of the follower roller 19 of the slide 17 and the width of the slot being a bit larger than the diameter of the follower roller 19. The cylindrical member 21f is provided with ten bolt holes 21g, which are applied near the upper edge of element 21f at a mutual angle distance of 36° and through which bolts are inserted for fastening the member 21f to a drum (not drawn), which is fixedly fastened to the central shaft 1. The dotted line 21h represents the path of the axis of the follower roller 19.

The operation of the device is as follows:

It is assumed that when the follower roller 18 of the first or lowermost slide 16 during rotation of the processing unit 4 in the direction R reaches point C of the curved path 20, the processing member 44 is in the rotational position of 0°. The follower roller 19 of the second slide 17 then still is on the horizontal portion 21a of the curved path 21.

When the processing unit 4 rotates about the shaft 1 from the rotational position of 0° the follower roller 18 moves on the downwardly inclining portion 20b of the curved path 20, the processing unit 4 with the slide 16 moving downwardly, until the bottom clip 25 will rest between the legs of the bird V on the bottom thereof, so that the downward movement of the slide 16 is stopped and the bird is stretched in the processing unit, the bird V being pressed with the rear side of his upper legs against the retaining clips 26 and thanks to the shape of the bottom clips 25 and 25' according to FIGS. 2 and 3 the bird is prevented from "hinging" about the ankle joints. This point is reached after a rotation of the processing unit 4 over a circumferential angle of ±35°, whereby the follower 19 of the slide 17 has arrived in the transition point D in the curved path 21.

During further rotation of the processing unit 4 in the direction R the lowermost or first slide 16 remains stationary in vertical direction, whereas the second slide 17 with the follower roller 19 first follows the portion 21b from the point D to a point E of the curved path 21 over a circumferential angle of ±65, the slide 17 moving towards the stationary slide 16 and the toothed rack 28 causes the processing member or knife 33 to rotate in the direction B via the toothed wheels 30, 31 and 32, FIGS. 1, 2 and 3.

Moreover, the machine is adapted and adjusted in such a way that the straight portion 36a of the cutting edge 36 at the beginning of the operative stroke, vide FIG. 2, is about vertical or perpendicular to the bottom of the bird V, and at the end of the operative stroke, vide FIG. 3, is about horizontal or parallel to the back part of the bird, so that the cutting edge 36 as it were draws the skin up and can cut it through in a good and reliable way, whilst in this way also the risk of damage of the intestines of the bird V is restricted to a minimum, because the cutting edge 36 need to be inserted into the skin of the bird V only over a small distance, ±1.5 cm.

When the bottom clip 25, 25' is pressed to the bottom of the bird V, the follower roller 18 of the processing unit 4 is still present on the portion 20b of the curved path 20 and remains at some distance above the portion 20c of the curved path 20 when the processing unit 4 is rotated in the direction R. The follower roller 19, however, then follows the portion 21b of the curved path 21, until the point E has been reached, whereby the downward movement of the slide 17 stops and the processing member or knife 33 remains stationary.

The follower roller 19 then moves over the substantially horizontal portion 21c of the curved path 21 between the points E and F and then over the portion 21d of the curved path 21 of the point F to the point G, where an angle of rotation of ±180° from the starting or beginning position of 0° has been reached. During this ratation of the processing unit 4 the slide 17 first moves upwardly with respect to the slide 16, so that the knife is rotated back oppositely to the direction B, until the follower roller 16 contacts the portion 20d of the curved path 20, whereupon the slides 16 and 17 together move upwardly and the follower rollers 18 and 19 reach the points G' and G of the curved paths 20 and 21 resp. about simultaneously. The point G' is also at an angle of rotation of ±180° from the starting position of 0° rotation.

Subsequently the follower rollers 18 and 19 of the slides 16 and 17 mover over an angle of rotation of ±180° over the portions 20a and 21e–21a of the curved paths 20 and 21 resp., whereby the starting position of 0° rotation has been reached again and during said rotation over 180° the slides 16 and 17 remaining stationary with respect to each other. Then the follower roller 18 moves again on the downwardly inclining portion 2 of the curved path 20, and the above-described cycle is performed again.

During operation of the above-described device, wherein the slides 16 and 17 move in vertical direction with respect to each other as a result of the movement of the follower rollers 18 and 19 over the curved paths 20 and 21, the processing member 33 rotates in total over a circumferential angle of ±110° to ±160°, in dependecy of the place where the lowermost slide 16 stops during the downward movement, in the operative direction of movement B, FIGS. 2 and 3 and then over the same angle back in reversed direction. The operative stroke of the processing element 33 covers a circumferential angle of ±90° to ±140° in the direction of movement B.

I claim:

1. A device for cutting open the bottom of a slaughtered bird (V) suspended with the legs from a hook (23) of a conveyor (7), comprising a processing member (33) to be inserted into the bird and provided with a cutting edge (36), said cutting edge being movable along a portion of a circular arc and cooperating with a follower (19) which in its turn cooperates with a fixedly disposed curved path (21), which processing member (33) is mounted on a slide (16), which is movable up and down in the direction of the bird (V) along a slide guide (14) moving along with the conveyor (7) and which cooperates with a fixedly disposed curved path (20) for the control of the movement of the slide (16), which is provided with a bottom clip (25, 25') which can engage the bottom between the legs of the birds (V), characterized in that at least a portion (36a) of the cutting edge (36) of the processing member (33) from the foremost, outermost point (39) thereof is substantially vertical at the beginning of the operative stroke and is substantially horizontal at the end of the operative stroke, and that at least the said portion (36) of the processing member (33) in the operative direction of movement (B) of the processing member (33) is trailing with respect to the foremost, outermost point (39) of the cutting edge (36) in this direction.

2. A device according to claim 1, characterized in that at least the said portion (36a) of the cutting edge (36) of the processing member (33) includes a sharp angle ($a$) with the connecting line (38) between the centre of rotation (34') of the processing member (33) and the foremost, outermost point (39) of the cutting edge (36) on the side of that connecting line (38) turned away from the operative direction of movement (B).

3. A device according to claim 2, characterized in that the processing element is an L-shaped plate (33), that the axis of rotation (34') of the plate (33) is positioned near the free end of the long leg (35) of the L and the cutting edge (36) is disposed on the short leg (37) of the L on the side facing the axis of rotation (34') and that the sharp angle (α) is ±40°.

4. A device according to claim 1, characterized in that the procesing element (33) is drivably coupled to a second slide (17) by means of a transmission device (28, 30-32), which second slide is movable up and down in the direction of the bird(V) along a slide guide (14) moving along with the conveyor (7) and to which the follower (19) is applied.

5. A device according to claim 4, characterized in that the processing member (33) is coupled to the second slide (17) by means of a toothed gearing (28, 30-32).

6. A device according to claim 5, characterized in that the first slide (16) is provided with a toothed gear box (29) having an odd number of toothed wheels(-30-32), the output toothed wheel (32) of which is fixedly connected to the processing member (33) and the input toothed wheel (30) is in engagement with a toothed rack (28), which is hingedly connected to the second slide (17).

7. A device according to claim 4, characterized in that both slides (16, 17) are mounted vertically slidable on the same pair of guide rods (14).

8. A device according to claim 4, characterized in that the bottom clip (25, 25') on both sides at the outer side is provided with a stop (26) adjustable in longitudinal direction of the clip.

9. A device according to claim 8, characterized in that the bottom clip (25, 25') is mounted to the slide (16) in a vertically adjustable manner.

* * * * *

UNITED STATES PATENT AND TRADEMARK OFFICE
CERTIFICATE OF CORRECTION

PATENT NO. : 4,731,907
DATED : March 22, 1988
INVENTOR(S) : Rudolf J. Tieleman

It is certified that error appears in the above—identified patent and that said Letters Patent is hereby corrected as shown below:

On the cover page, in field [75], the letters "Aw" should be deleted.

On the cover page, in the Abstract, last line, "cutting in" should read -- cutting edge in --.

Column 1, line 10, "wtih" should read -- with --.
Column 1, line 34, "when" should read -- whereby --.
Column 3, line 20, "$\pm^\circ$" should read -- $\pm 20^\circ$ --.
Column 3, line 55, "angle of" should read -- angle ∝ of --.
Column 4, line 7 "membrt" should read -- member --.
Column 4, line 27, "protion" should read --portion --.
Column 4, line 58, "$\pm 65$" should read -- $\pm 65^\circ$ --.
Column 5, line 34, "$\pm 65$" should read -- $\pm 65^\circ$ --.
Column 5, line 67, "ratation" should read -- rotation --.
Column 6, line 53, "(36)" should read -- (36a) --.

Signed and Sealed this

Twenty-seventh Day of December, 1988

Attest:

DONALD J. QUIGG

*Attesting Officer*    *Commissioner of Patents and Trademarks*